US008095936B2

(12) United States Patent
Avery et al.

(10) Patent No.: US 8,095,936 B2
(45) Date of Patent: Jan. 10, 2012

(54) REMOTELY CONTROLLING AND VIEWING OF SOFTWARE APPLICATIONS

(75) Inventors: Marcus Leo Avery, Tomball, TX (US); Ryan Daniel Hatfield, San Angelo, TX (US); Samuel Cooper Grantham, San Antonio, TX (US); Marcos Suuru Kajita, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1309 days.

(21) Appl. No.: 11/700,392

(22) Filed: Jan. 31, 2007

(65) Prior Publication Data
US 2008/0184269 A1 Jul. 31, 2008

(51) Int. Cl.
G06F 3/00 (2006.01)
G06F 9/44 (2006.01)
G06F 15/177 (2006.01)
(52) U.S. Cl. .................. 719/310; 717/127; 715/736
(58) Field of Classification Search .................. 719/318; 717/127, 120; 715/736
See application file for complete search history.

(56) References Cited

U.S. PATENT DOCUMENTS

| 5,134,495 | A * | 7/1992 | Frazier et al. ................ 382/299 |
| 5,408,600 | A | 4/1995 | Garfinkel et al. |
| 5,801,689 | A | 9/1998 | Huntsman |
| 5,909,545 | A | 6/1999 | Frese, II et al. |
| 6,941,340 | B2 * | 9/2005 | Kim et al. .................... 709/203 |
| 7,115,035 | B2 * | 10/2006 | Tanaka ........................... 463/42 |
| 7,139,834 | B1 * | 11/2006 | Albanese et al. ............. 709/238 |
| 7,346,108 | B2 * | 3/2008 | Maeda ...................... 375/240.16 |
| 2003/0061279 | A1 | 3/2003 | Llewellyn et al. |
| 2004/0182574 | A1 | 9/2004 | Adnan et al. |
| 2005/0146507 | A1 * | 7/2005 | Viredaz ........................ 345/169 |
| 2007/0294034 | A1 * | 12/2007 | Bratton et al. .................... 702/6 |

FOREIGN PATENT DOCUMENTS

| EP | 1164482 B1 | 10/2008 |
| WO | WO-00/26794 A1 | 5/2000 |
| WO | WO-01/75836 A2 | 10/2001 |
| WO | WO-2008/094521 A2 | 8/2008 |

OTHER PUBLICATIONS

Ii-Yop Chung, Development of Power Quality Diagnosis System for Power Quality Improvement, 2003.*
"International Application Serial No. PCT/US2008/001119, International Search Report mailed Aug. 28, 2008", 6 pgs.
"International Application Serial No. PCT/US2008/001119, Written Opinion mailed Aug. 28, 2008", 12 pgs.
Miller, J. R, et al., "A Framework for Collaborative Control of Applications", *Proceedings of the 2005 ACM Symposium on Applied Computing*, (2005), 1244-1249.

(Continued)

*Primary Examiner* — Lechi Truong
(74) *Attorney, Agent, or Firm* — Schwegman, Lundberg & Woessner, P.A.

(57) ABSTRACT

In some embodiments, a method includes receiving an input for a software application that is executing on a controlled device. The method also includes transmitting, over a network, an identification of an event for the software application, that is a result of the input, to a controller device to remotely control execution of the software application. The identification of the event comprises an identification of at least one of a control and the input for the control.

22 Claims, 10 Drawing Sheets

OTHER PUBLICATIONS

"Application Serial No. 2008211210 Office Action mailed Mar. 22, 2010", 2 pgs.

"Australian Application Serial No. 2008211210, Response filed Mar. 17, 2011 to First Examiner Report mailed Mar. 22, 2010", 11.

"British Application Serial No. 0914768.7, Office Action mailed Oct. 18, 2010", 5 pgs.

"British Application Serial No. 0914768.7, Office Action Response Filed Feb. 9, 2011", 18 pgs.

"United Kingdom Application Serial No. 0914768.7, Office Action Mailed Apr. 20, 2011", 2 pgs.

* cited by examiner

REMOTELY CONTROLLING AND VIEWING OF SOFTWARE APPLICATIONS

TECHNICAL FIELD

The application relates generally to data processing. In particular, the application relates to remotely controlling and viewing of software applications.

BACKGROUND

Control, from a remote location, of an application executing on a device enables user-control of such application without requiring the user to be physically present at the device. Such remote control may enable a single expert user to control numerous applications that may be executing on devices at any number of different geographical locations. Furthermore, remote viewing enables one or more individuals to monitor the execution of an application from various geographic locations.

BRIEF DESCRIPTION OF THE DRAWINGS

Embodiments of the invention may be best understood by referring to the following description and accompanying drawings which illustrate such embodiments. In the drawings.

DETAILED DESCRIPTION

Figure 1:
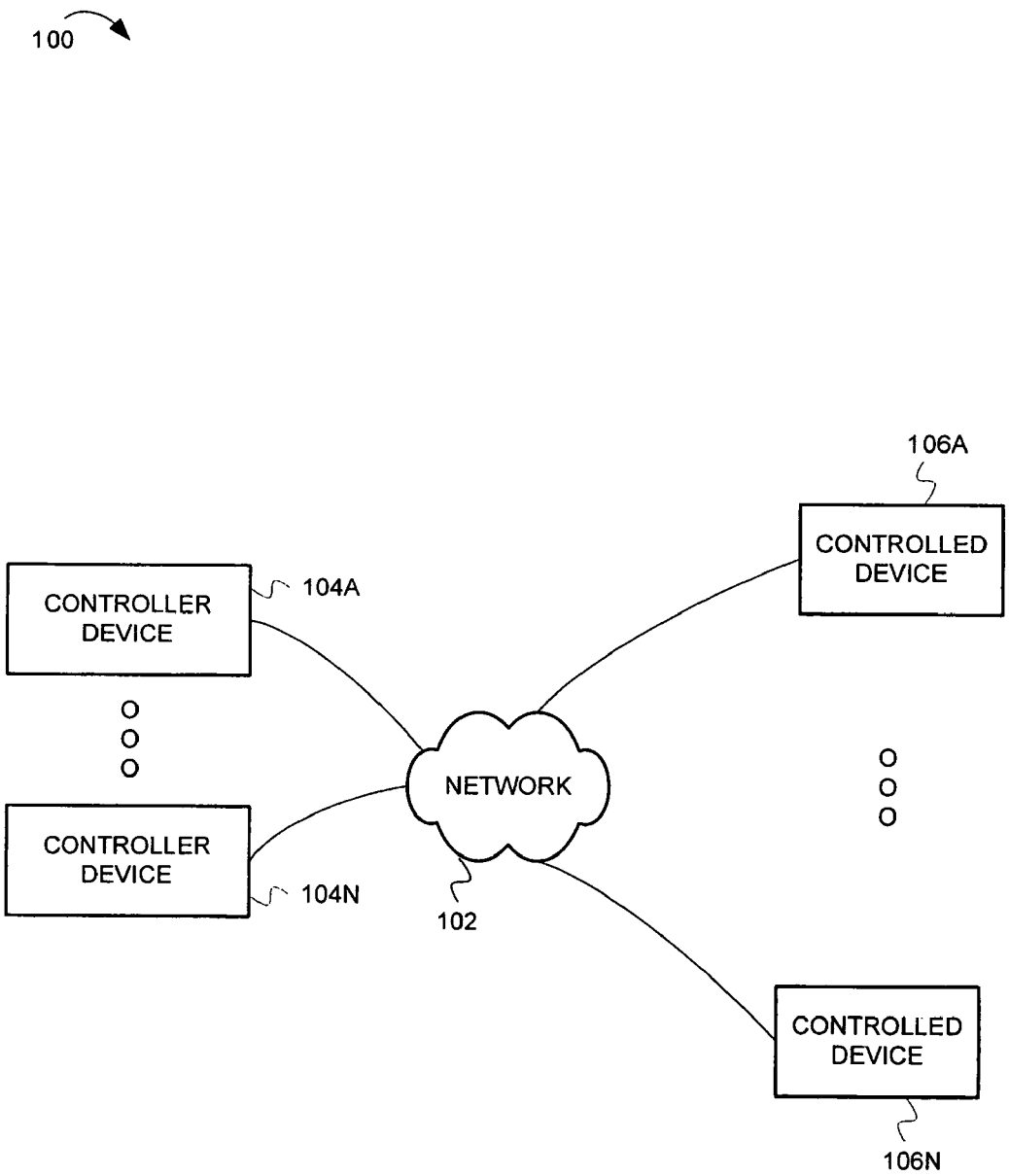
FIG. 1 is a network diagram of a system for remotely controlling and viewing applications, according to some embodiments.

Methods, apparatus and systems for remotely controlling and viewing of a software application are described. In the following description, numerous specific details are set forth. However, it is understood that embodiments of the invention may be practiced without these specific details. In other instances, well-known circuits, structures and techniques have not been shown in detail in order not to obscure the understanding of this description.

This description of the embodiments is divided into six sections. The first section describes a system operating environment. The second section describes an example controlled device and controller device. The third section describes remote controlling and viewing operations. The fourth section describes an example computer environment. The fifth section describes wellsite operating environments. The sixth section provides some general comments.

Some embodiments allow for controlling and viewing of software applications (executing on a controlled device) from a controller device located remote from the controlled device. For example, a user or software executing on the controller device may control a software application executing on the controlled device. With conventional approaches, such operations include transmission of pixel-based reproduction, wherein data for individual pixels is transmitted between the controlled device and the controller device. The graphical image on the controlled device can then be reproduced on a display of the controller device. Thus, the user of the controller device views the graphic output of the application executing on the controlled device. However, the transmission of pixel-based reproduction data requires that a large amount of data (data for individual pixels) be transmitted between such devices (e.g., megabytes of data per screen refresh). Thus, the rate at which the images on the controlled device are refreshed on the controller device may be visibly sluggish. Moreover, during times when the network communication is great, the bandwidth between the devices may be reduced, thereby causing refresh rates to be even less.

In contrast, in accordance with some embodiments, data communications between the controller device and the controlled device are less in comparison to the conventional pixel-based reproduction (as described above). In some embodiments, messages and events are transmitted between the controller device and the controlled device. Such messages and events may be decoded using a decoding library. In some embodiments, graphical images may then be reproduced using the decoded messages and events based on graphic software libraries. In some embodiments, various off-the-shelf graphic libraries may be used. Accordingly, embodiments are not dependent on a specific hardware or software configuration. Embodiments may be used on devices with different operating systems. Also, control input into the application from the remote location can be made without requiring the transmission of large amounts of pixel data.

Some embodiments allow an expert user on a controller device to control numerous applications around the world in real time. Some embodiments may reduce the overall number of expert users required because the remote sites need fewer experts. Some embodiments allow for certain remote sites, which may be dangerous (e.g., such as locations prone to terrorist activity) to be controlled without requiring local operators at such sites. Also, some embodiments may reduce costs of remote site personnel (such as transportation costs). Some embodiments also allow for local intervention at the controlled device to allow for salvaging an error caused by the controller device. In some embodiments, the software application is not required to be installed on the controller device. The input for control of the software application may be from various input devices (such as a mouse, keyboard, microphone, input files from various internal or external storage media, etc.).

Embodiments may be incorporated into any of a number of different applications. One example application is for controlling a device at a wellsite for drilling and recovery of hydrocarbons. In particular, controlled devices may be at various wellsites. Such devices may control various parameters for drilling, evaluation, recovery, etc. of hydrocarbons from downhole. Accordingly, an operator may control and monitor such operations at a controller device that is positioned remote to the wellsites. Thus, one operator may be able to control and view operations at any number of different wellsites. A more detailed description of such an application is set forth below. Embodiments may used in other applications. For example, embodiments may be used in various manufacturing or research and development operations. Accordingly, such operations may be controlled or monitored at different remote sites relative to where an application is executing. Embodiments may be used in telecommunications to diagnose errors at a remote device.

System Operating Environment

FIG. 1 is a network diagram of a system for remotely controlling and viewing applications, according to some embodiments. A system 100 comprises a network 102 that couples together one to a number of controller devices 104A-104N and a number of controlled devices 106A-106N.

The controller devices 104 and the controlled devices 106 may be any type of device that may execute a software application. The controller devices 104 and the controlled devices 106 may be a thin client, fat client, or a hybrid client. The controller devices 104 and the controlled devices 106 may be desktop computers, notebook computers, wireless/wired devices, mobile devices (such as cellular telephones, Personal Digital Assistants (PDAs)), media players (such as MP-3 devices), gaming consoles, set-top boxes, etc.

As further described below, in some embodiments, graphics output from a software application executing on the controlled device 106 is reproduced on the controller device 104. This reproduction may be generated without transmission of pixel-based reproduction data between the controlled device 106 and the controller device 104. As further described below, the controller device 104 may input controls into the application using event messaging between the controller device 104 and the controlled device 106.

The network communication may be any combination of wired and wireless communication. In some embodiments, the network communication may be based on one or more communication protocols (e.g., HyperText Transfer Protocol (HTTP), HTTP Secured (HTTPS), Abstract Diagrammatic Interaction (ADI), Well Information Transfer Standard Markup Language (WITSML), etc.).

In some embodiments, one to any number of controller devices 104 may control or view an application executing on a controlled device 106. For example, one or more controller devices 104 may control the application, while one or more controller devices 104 monitor the application. Moreover, one controller device 104 may remotely control and view multiple applications executing on same or different controlled devices 106.

Example Controlled Device and Controller Device

Figure 2:
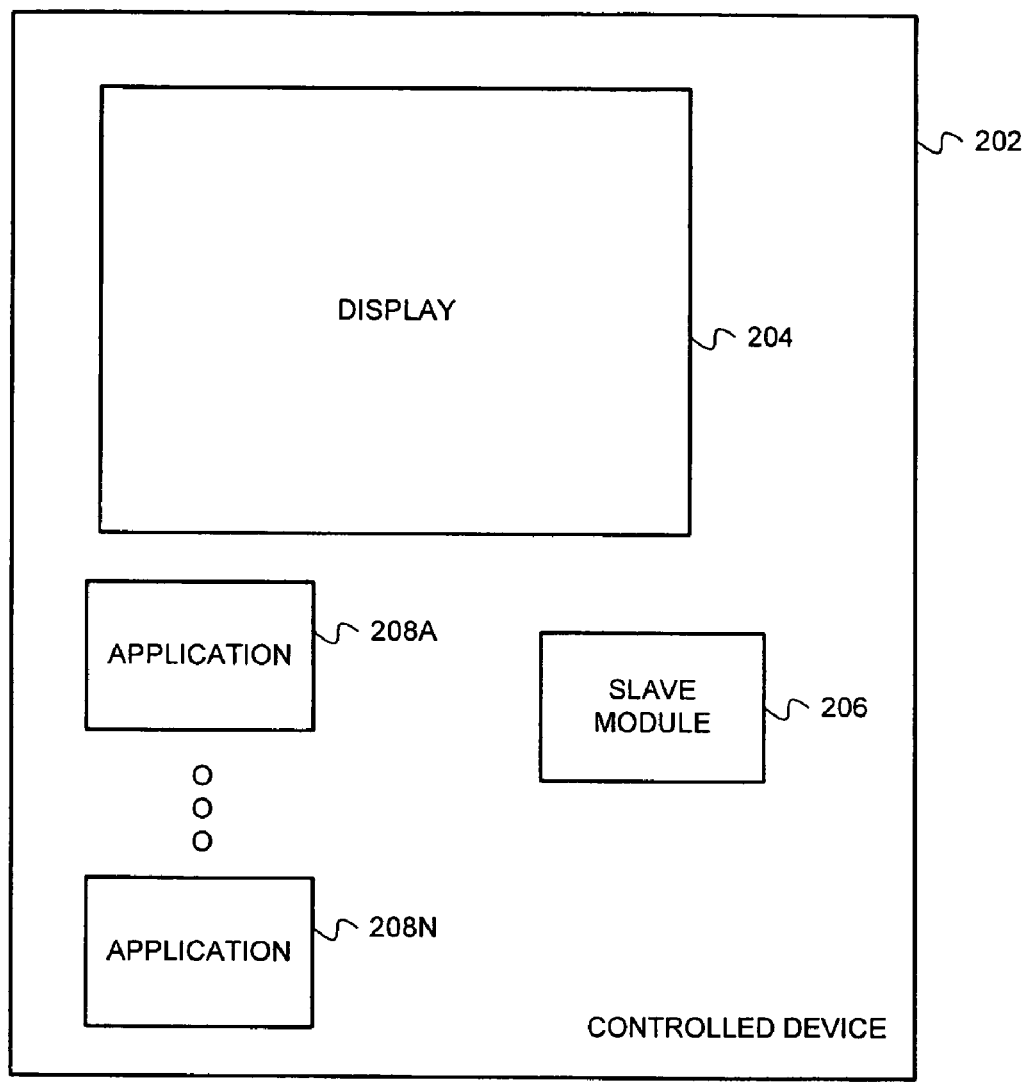
FIG. 2 is a block diagram of parts of the controlled device 106, according to some embodiments.
Figure 8:
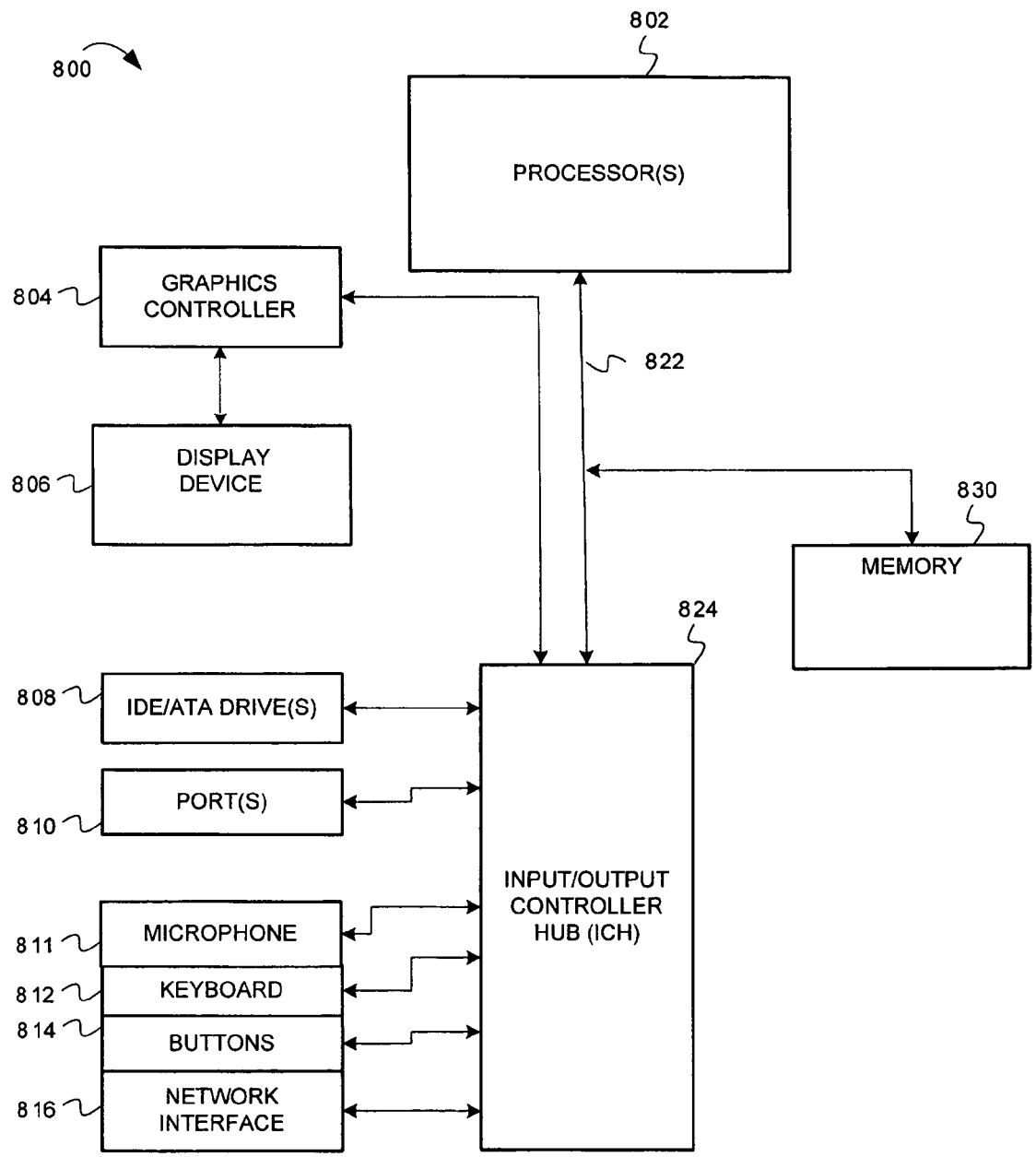
FIG. 8 illustrates a computer that may be used for monitoring wellsite data, according to some embodiments.

FIG. 2 is a block diagram of parts of the controlled device 106, according to some embodiments. A more detailed diagram of an example embodiment of the controlled device 106 is illustrated in FIG. 8, which is described in more detail below. A controlled device 202 (representative of some embodiments of the controlled device 106) may include a display 204, one to a number of applications 208A-208N and a slave module 206. The display 204 may be a Liquid Crystal Display (LCD), a Cathode Ray Tube (CRT), Surface-Conduction Electron-Emitter Display (SED), plasma display, etc. The applications 208 may be software applications (which may be stored on volatile or nonvolatile machine readable media (not shown)) executing on a processor (not shown). The graphical output from execution of the applications 208 may be output on the display 204.

The slave module 206 may be hardware, software, firmware or a combination thereof. As further described below, the slave module 206 may transmit and receive communications between the applications 208 and a controller device 104. For example, such communication may include data for graphical reproduction of data on a display of the controller device 104, data for control of the application 208 from the controller device 104, data for control of the application 208 from a local user of the controlled device 106 to the controller device 104, etc. While described such that the slave module 206 is executed on the controlled device, in some embodiments, the slave module 206 may be executed on one of the controller devices 104, a different controlled device 106 or any other device coupled for communication between the controller device 104 and the controlled device 106.

Figure 3:
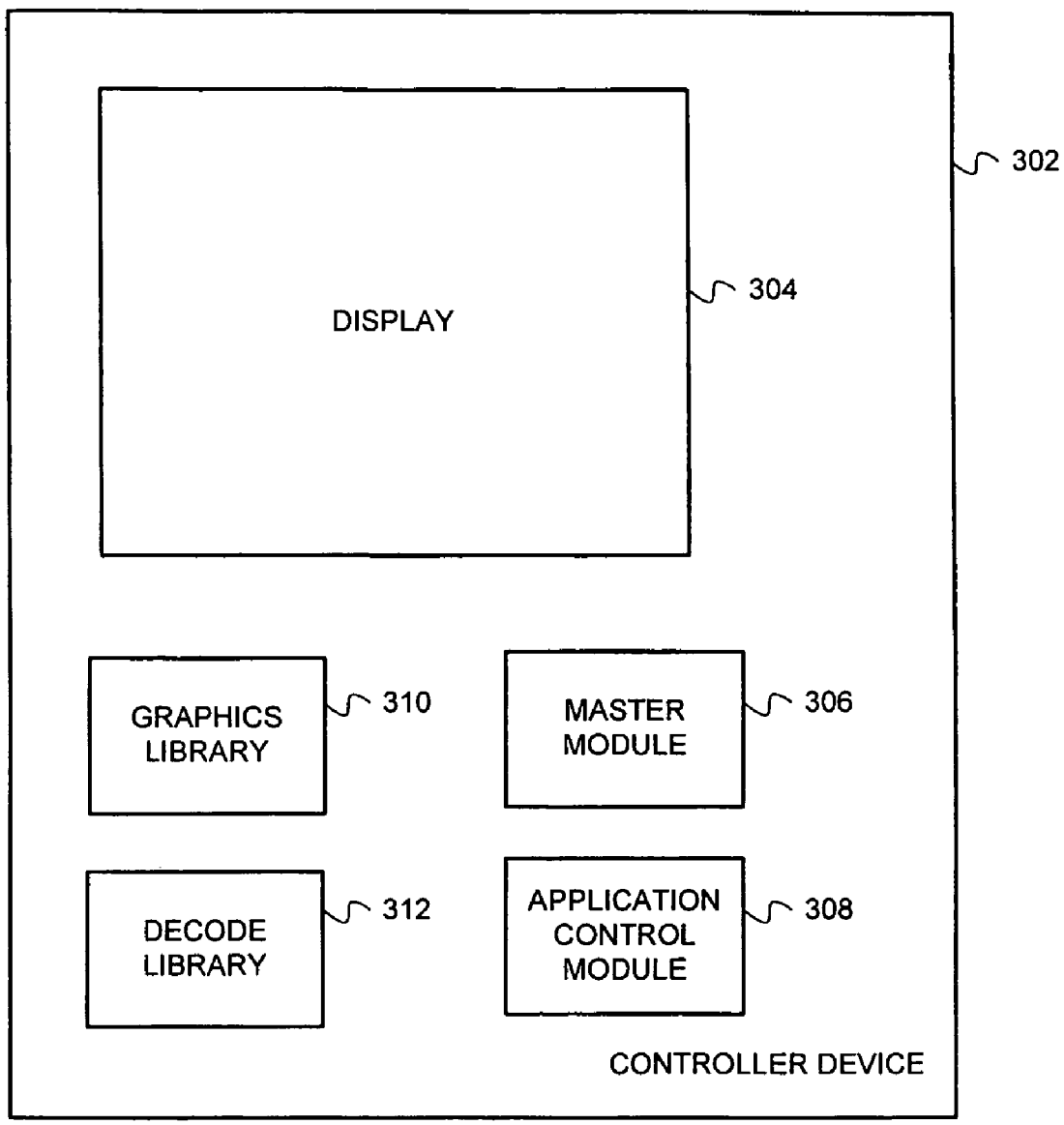
FIG. 3 is a block diagram of parts of the controller device 104, according to some embodiments.

FIG. 3 is a block diagram of parts of the controller device 104, according to some embodiments. A more detailed diagram of an example embodiment of the controller device 104 is illustrated in FIG. 8, which is described in more detail below. A controller device 302 (representative of some embodiments of the controller device 104) may include a display 304, a master module 306, an application control module 308, a graphics library 310 and a decode library 312. The display 304 may be a Liquid Crystal Display (LCD), a Cathode Ray Tube (CRT), Surface-Conduction Electron-Emitter Display (SED), plasma display, etc.

The master module 306 and the application control module 308 may be hardware, software, firmware or a combination thereof. As further described below, the application control module 308 may generate events from local user input related to controlling an application on the controlled device 106. The application control module 308 may also process commands and events generated on the controlled device 106. For example, the application control module 308 may update the display 304 to reproduce the graphics on the display of the controlled device 106. In some embodiments, the application control module 308 uses the decode library 312 to decode the data received from the controlled device 106. The application control module 308 may then use the decoded data and the graphics library 308 to update the display 304. In some embodiments, the graphics library 308 may be various types of off-the-shelf libraries that include various functions for graphics output.

The master module 206 may transmit and receive communications between the applications executing on the controlled device 106 and the application control module 308. For example, such communication may include data for graphical reproduction of data on a display of the controller device 104, data for control of an application 108 from the controller device 104, data for control of an application 108 from a local user of the controlled device 106 to the controller device 104, etc.

Remote Controlling and Viewing Operations

Figure 4:
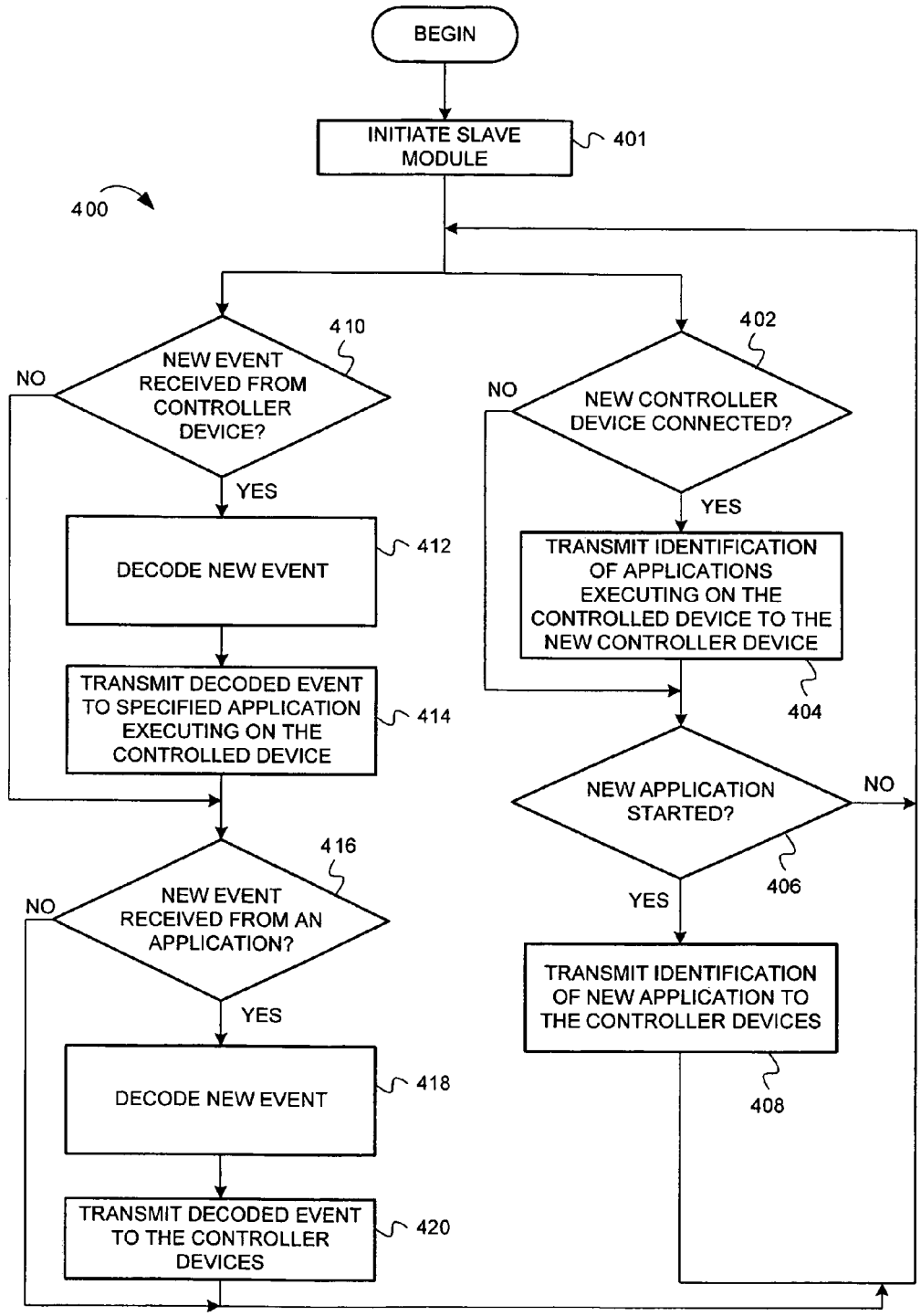
FIG. 4 is a flow diagram for transmitting events and commands between an application executing on a controlled device and the controller device for remote controlling and viewing of such application, according to some embodiments.
Figure 5:
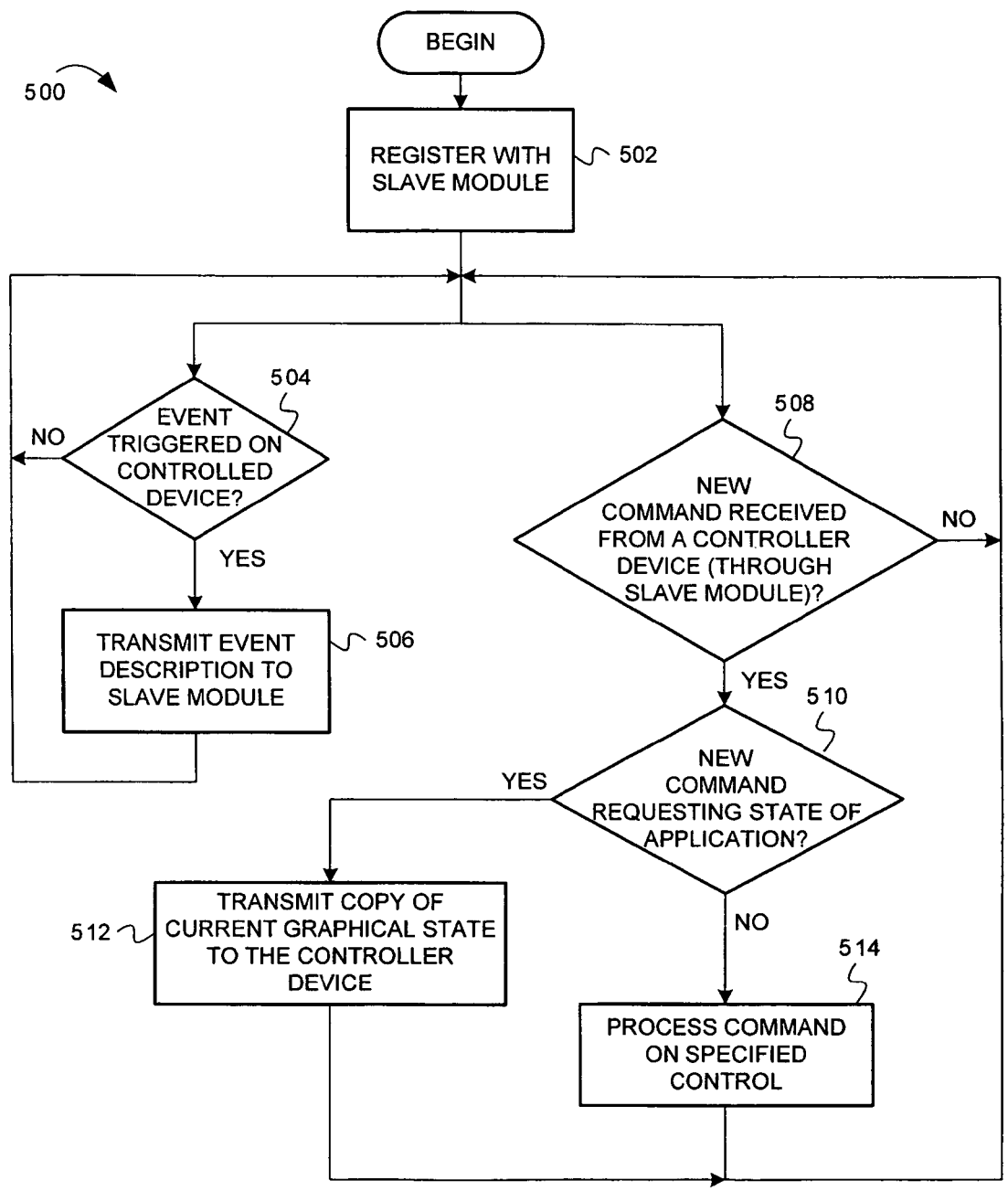
FIG. 5 is a flow diagram for processing events and commands by an application that may be controlled or viewed remotely, according to some embodiments.
Figure 6:
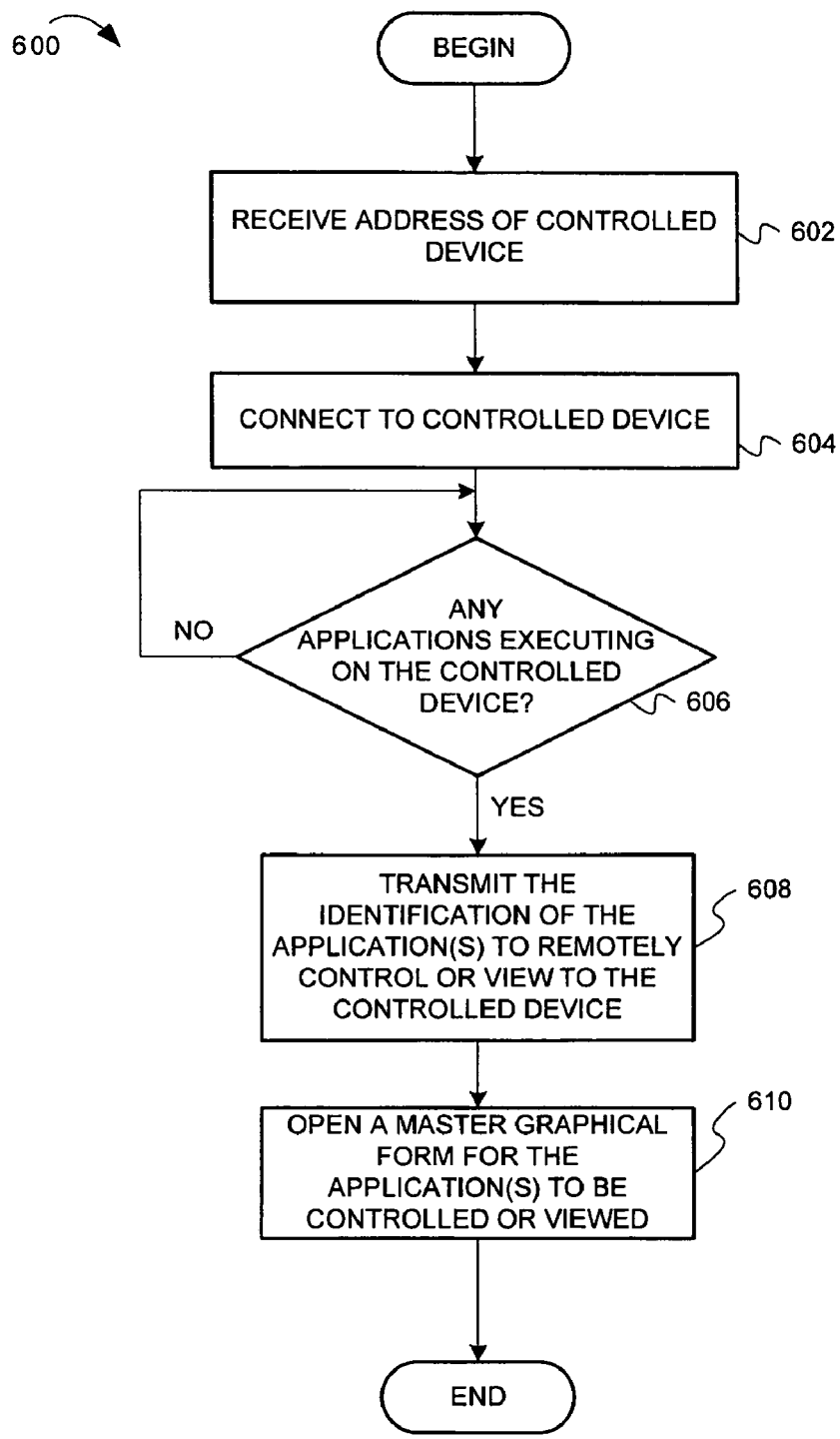
FIG. 6 is a flow diagram for establishing a connection by the controller device for controlling or viewing a software application executing on a controlled device, according to some embodiments.
Figure 7:
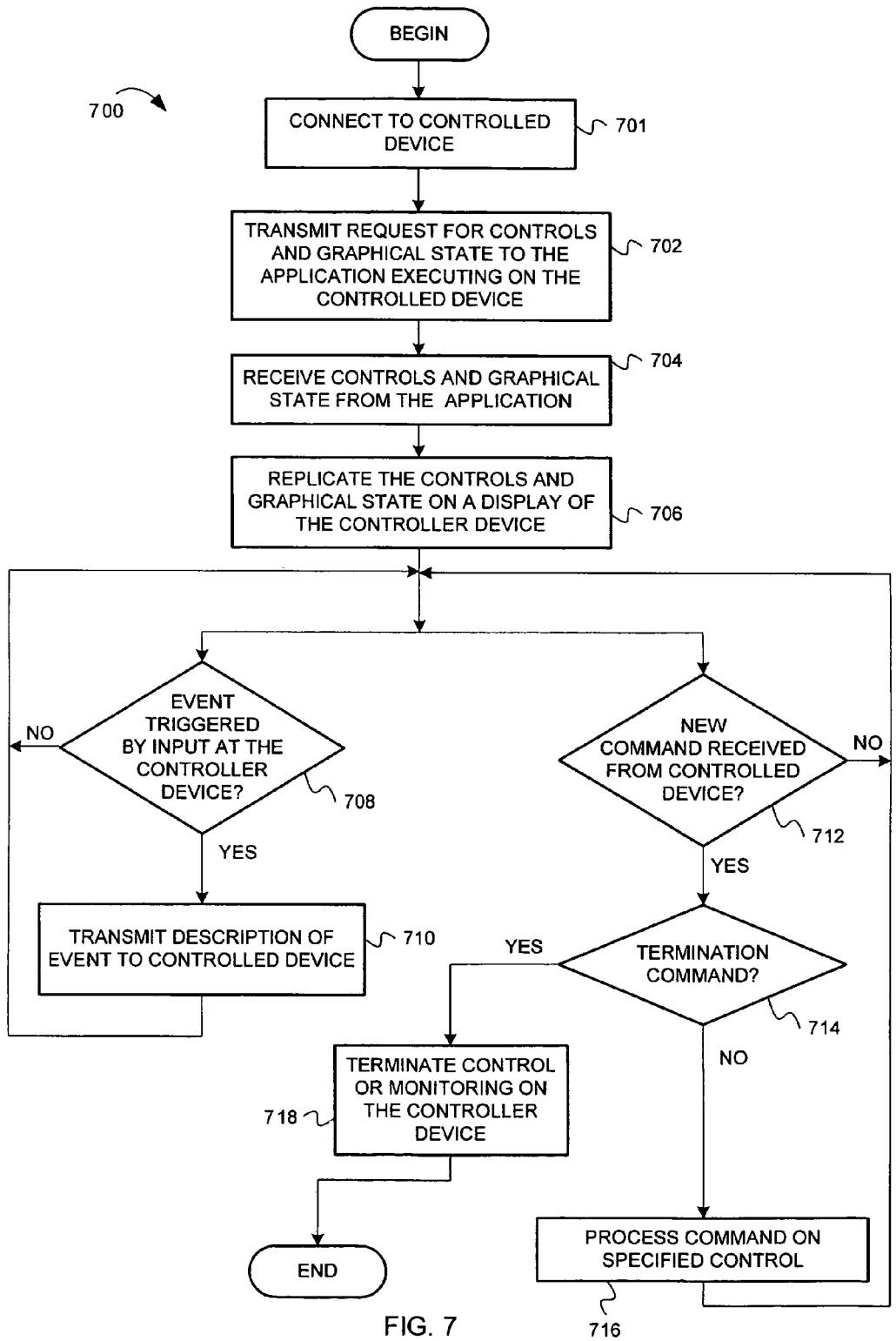
FIG. 7 is a flow diagram for processing events and commands at a controller device that is remotely controlling or viewing an application, according to some embodiments.

Operations that may be executed in the controlled device 106 and the controller device 104, according to some embodiments, is now described. FIGS. 4-5 illustrate operations that may be executed in the controlled device 106 (by the slave module 206 and one of the applications 208, respectively). FIGS. 6-7 illustrate operations that may be executed in the controller device 108 (by the master module 306 and the application control module 308, respectively).

FIG. 4 is a flow diagram for transmitting events and commands between an application executing on a controlled device and the controller device for remote controlling and viewing of such application, according to some embodiments. In particular, FIG. 4 includes a flow diagram 400 that illustrates operations that may be performed by the slave module 206 executing on the controlled device 106. The operations by the slave module 206 provide for communication between one or more applications 208 executing on the controlled device 106 and one or more controller devices 104. The flow diagram 400 is described with reference to FIGS. 1-3. The flow diagram 400 includes two branches. The first branch and the second branch include blocks 402-408 and blocks 410-420, respectively. The operations at blocks 402-408 are typically executed after a new controller device 104 is connected to remotely view or control an application executing on the controlled device 106. The operations at blocks 410-420 are typically executed after an event or command for the application is received (from either local input at the controlled device 106 or from remote input at the controller device 104). The flow diagram 400 commences at block 401.

At block 401, the slave module is initiated. With reference to FIG. 2, the slave module 206 on the controlled device 202 is initiated (begin execution). For example, the slave module 206 may be a software application that is initiated during the power-up operations of the controlled device 202, after one of the applications 208 are started, etc. The flow continues at blocks 402 and 410.

At block 402, a determination is made of whether any new controller devices 104 have connected. With reference to FIG. 2, the slave module 206 may make this determination. With reference to FIG. 1, for example, N number of controller devices 104 may be attempting to connect to the controlled device 106 through the network 102 (after the salve module 206 has been initiated). These N number of controller device 104 may transmit periodic ping messages to establish communication. Alternative or in addition, a different device on the network may store the identification of the controller devices 104 and the controlled devices 106, after such devices are operational to commence communications. Moreover, the identification of the devices that a given controller device or controlled device is attempting to connect to may also be stored therein. Accordingly, the slave module 206 may retrieve the identification of the controller devices 104 that are attempting to connect to the controlled device 106. Upon determining that one or more new controller devices 104 are connected to the controlled device 104, the flow continues at 404. Otherwise, the flow continues at block 406 (which is described in more detail below).

At block 404, identification of applications (that are remotely controllable or viewable) executing on the controlled device are transmitted to the new controller devices. The slave module 206 may perform this operation. In particular, one to N number of applications that may be controlled or viewed remotely may be executing on the controlled device 106. The applications may have unique identifications to allow the controller devices 104 to identify which, if any, of the applications, are to be controlled or viewed remotely. These identifications are transmitted over the network 102 to each of the new controller devices 104. The new controller devices 104 may then connect to the applications for remote controlling or viewing (as further described below). The flow continues at block 406.

At block 406, a determination is made of whether a new application is started. The slave module 206 may make this determination. In particular, new applications may be started at any point while the controlled device 202 is operational. For example, if a new drilling operation is commenced, a new application may be started to monitor and control such activity downhole, accordingly an operator may start a new application on the controlled device 202 at various times of downhole activity. In some embodiments, the slave module 206 may review the applications that are executing to determine (based on their identification) whether new applications have been started. Upon determining that a new application is started, the flow continues at block 408. Otherwise, the flow continues at blocks 402 and 410.

At block 408, the identification of the new application is transmitted to the connected controller devices. The slave module 206 may perform this operation. A list of the controller devices 104 that are connected to the controlled device 106 may be maintained by the slave module 206. The slave module 206 may transmit a message with the identification of this new application to the controller devices 104 on this list. The flow continues at blocks 402-410. Accordingly, as described, the operations at blocks 402-408 may continue to be performed as long as the slave module 206 is operational. Thus, the slave module 206 may periodically check for new controller devices and for new applications.

The operations at blocks 410-420 are now described. These operations may be executed after an event or command for the application is received (from local input or from remote input at a controller device 106).

At block 410, a determination is made of whether a new event is received from a controller device. The slave module 206 may make this determination. In some embodiments, the event may include some type of event to alter an operation of an application. For example, the event may be different inputs for processing by the application (such as a button press or selection, data input into a graphic of a display for an application, etc.). In some embodiments, the event is transmitted as a message that includes an identification of the input on the graphic window and an identification of the input. For example, if a Graphical User Interface (GUI) window comprises four different buttons. The event message includes an identification of the button and that the button was selected. If the GUI window includes a text input box, the event message may include an identification of the text input box and the type of input. For example, a user may input his name into such a box. Accordingly, the event message may include the characters inputted into the text box. Upon determining that a new event is received from a controller device, the flow continues at block 412. Otherwise, the flow continues at block 416 (which is described in more detail below).

At block 412, the new event is decoded. The slave module 206 may perform this operation. The event message may include the identification of which application and an identification of which control of the application that this event is associated. For example, a GUI window may include 20 different controls (such as various buttons, text input, etc.). The identification of the control may be a unique identifier for one of the controls. Therefore, the slave module 206 decodes the new event to determine which application and which control in such application. For example, the input may be a button press for a given GUI window for a particular application executing on the controlled device 106. The flow continues at block 414.

At block 414, the decoded event is transmitted to the specified application executing on the controlled device. The slave module 206 may perform this operation. For example, the slave module 206 may generate a user-input interrupt for the application. The application may then process the event accordingly. The processing of the event by the application is described in more detail below in the flow diagram 600 of FIG. 6. The flow continues at block 416.

At block 416, a determination is made of whether a new event is received from an application (executing on the controlled device). The slave module 206 may make this determination. The new event may include updates to the GUI window for the application. For example, processing of input from a local user (such as a button selection) may change to a different GUI window or alter the current GUI window. The new event may be a result of an event from a controller device. For example, the event from the controller device (such as text input or button selection) may change to a different GUI window or alter the current GUI window. Upon determining that a new event is not received from an application (executing on the controlled device), the flow continues at blocks 402 and 410. Otherwise, the flow continues at block 418.

At block 418, the new event is decoded. The slave module 206 may perform this operation. The event message may include an alphanumeric value to identify which control of the application that this event is associated. A GUI window may include 20 different controls (such as various buttons, text input, etc.). The alphanumeric value may be a unique identifier for one of the controls. Therefore, the slave module 206 decodes the new event to determine the control. For example, the input may be a button press for a given GUI window for a particular application executing on the controlled device. The flow continues at block 420.

At block 420, the decoded event is transmitted to the controller devices that are connected to the application. The slave module 206 may perform this operation. The message that is transmitted may be an encrypted value that identifies specific sections of a current GUI window to update, the change to a different GUI window, etc. For example, if user input may cause a change to a different GUI window, an update (such as color or graphic updates) to the current GUI window, etc. The processing of the event by the controller device 104 is described in more detail below in the flow diagram 600 and 700 of FIGS. 6 and 7, respectively. Accordingly, as described, the operations at blocks 410-420 may continue to be performed as long as the slave module 206 is operational. Thus, the slave module 206 may periodically check for new events from the controller devices or the applications.

While the operations in the flow diagram 400 are described such that the slave module 206 performs periodic checking, in some embodiments, such operations are interrupt driven. For example, after a new application is started, the slave module 206 receives an interrupt to transmit the identification of the new application to the controller devices 104 that are connected.

FIG. 5 is a flow diagram for processing events and commands by an application that may be controlled or viewed remotely, according to some embodiments. In particular, FIG. 5 includes a flow diagram 500 that illustrates operations that may be performed by one of the applications 208 executing on the controlled device 106. The flow diagram 500 is described with reference to FIGS. 1-3. The flow diagram 500 includes two branches. The first branch and the second branch include blocks 504-506 and blocks 508-514, respectively. The operations at blocks 504-506 are executed because an event or command for the application is received (from local input at the controlled device 106). The operations at blocks 508-514 are executed because an event or command for the application is received (from remote input at a controller device 104). The flow diagram 500 commences at block 502.

At block 502, the application is registered with the slave module. With reference to FIG. 2, the slave module 206 may control one to any number of applications 208. After the application 208 is initiated, the application 208 may transmit a registration message to the slave module 206. The slave module 206 may then register this application 208 as an application that can be controlled and viewed remotely by a controller device 104. The flow continues at blocks 504 and 508.

At block 504, a determination is made of whether an event is triggered on the controlled device. The application 208 may make this determination. In particular, the application 208 may determine whether local input (either from a local user input, local automated software, etc.) on the controlled device 106 was generated for input into the application 208. For example, the event may be a button selection, data input, etc. into the application 208. The event may cause a change to a different GUI window or alter the current GUI window. Upon determining that an event is not triggered on the controlled device 106, the flow continues at blocks 504 and 508. Otherwise, the flow continues at block 506.

At block 506, the event description is transmitted to the slave module. The application 208 may perform this operation. The event description may include a unique identification for events that may occur for the application 208. In some embodiments, the event description is transmitted to the controller devices 104 that may be remotely controlling/viewing the application 208. In some embodiments, the event description is for updates to the display being shown at the controller devices 104. In particular, the event description enables the graphical image on the display of the controlled device 106 to be reproduced on the display of the controller devices 104. For example, the identification may include the identification of what control on the display received an input, the type of input for the control, etc. This operation may be in addition to processing of the event locally by the application 208. For example, the event may trigger updates to the current GUI window, the launching of a separate application, a print job, an output for control, etc. The flow continues at blocks 504 and 508. Accordingly, as described, the operations at blocks 504-506 may continue to be performed as long as the application 208 is operational.

At block 508, a determination is made of whether a new command is received from a controller device (through the slave module). The application 208 may make this determination. The new command may be an input into the application 208. For example, the command may be a control input (such as a button press or selection or data input into a graphic of a display for the application 208 that is reproduced on a display of the controller device 104). As described below, the new command may also be a request of a copy of the controls and current graphical state of the application 208. Upon determining that a new command is received from a controller device 104, the flow continues at block 510. Otherwise, the flow continues at blocks 504 and 508.

At block 510, a determination is made of whether the new command is requesting state of the application. The application 208 may make this determination. In particular, the controller device 104 may request the state of the application 208 after connecting with the controlled device 106. The application 208 may have been executing for a period of time. Therefore, the current graphical state is transmitted to the controller device 104 to allow the graphics to be reproduced on the display of the controller device 104. Upon determining that the new command is requesting the state of the application 208, the flow continues at block 512. Otherwise, the flow continues at block 514 (which is described in more detail below).

At block 512, a copy of the current graphical state of the application is transmitted to the controller device. The application 208 may perform this operation by transmitting such data to the slave module 206 (which forwards the data to the controller device 104). In some embodiments, the current graphical state transmitted is not a pixel-based reproduction of the graphics. Rather, the current graphical state may include an identification of which GUI window for the application 208 is being displayed, the state of any modifiable fields (such as control values), etc. Accordingly, this amount of data transmitted over the network to identify the current graphical state may be much less in comparison to data required to be transmitted for pixel-based reproduction wherein individual pixel values for the graphical display are transmitted. The flow continues at blocks 504 and 508.

At block 514, the new command on specified control is processed. The application 208 may perform this operation. The command made be different types of input into the application 208. For example, the command may be from a button selection, data input, etc. into the controller device based on the GUI window being displayed thereon. As described above, the command (which is from a decoded event from the slave module 206) may be a unique identifier for one of the controls and the data for this control on the GUI window for the application 208. For example, the command may identify a specific button on the GUI window and that such button was selected at the controller device 104. The application 208 processes the command. The processing may include changing the display graphics on the current GUI window, changing to a different GUI window, outputting a control to an external device, retrieving input data from an external device, etc. For example in a downhole operation, the application 208 may output a control to alter fluid flow, drill string rotation, etc. In some embodiments, if execution of the control by the application 208 alters the graphic output, an event description is transmitted to the controller device 104. In particular, an event description may be transmitted to the controller device 104 (similar to the operations at block 506 above). For example, if a new GUI window is being displayed, an event description is transmitted to the controller device 104. The flow continues at blocks 504 and 508. Accordingly, as described, the operations at blocks 508-514 may continue to be performed as long as the application 208 is executing. Thus, the application 208 may periodically check for new commands.

While the operations in the flow diagram 500 are described such that the application 208 performs periodic checking, in some embodiments, such operations are interrupt driven. For example, after a new command is received from a remote or local input, the application 208 receives an interrupt to process the command.

Operations that may be executed by the controller device 104 are now described. FIGS. 6-7 illustrate operations that may be executed in the controller device 104 (by the master module 306 and the application control module 308, respectively).

FIG. 6 is a flow diagram for establishing a connection by the controller device for controlling or viewing a software application executing on a controlled device, according to some embodiments. In particular, FIG. 6 includes a flow diagram 600 that illustrates operations that may be performed by the master module 306 executing on the controller device 104. The flow diagram 600 is described with reference to FIGS. 1-3. In some embodiments, the operations of the flow diagram 600 are initiated during the power-up operations of the controller device 104, after the application control module 308 is started, etc. The flow diagram 600 commences at block 602.

At block 602, the address of the controlled device is received. The address may be some type of network address (such as an Internet Protocol address). The master module 308 may receive this address from a list of available addresses of controlled devices 106. For examples, these addresses may be input by a user of the controller device 104. In some embodiments, the master module 308 may receive the address through some type of broadcast message or pinging operation on the network. The master module 308 may also receive this address from a different network device (a server) that maintains a list of addresses of controller devices and controlled devices that are currently operational. The flow continues at block 604.

At block 604, connection is made to the controlled device. The master module 306 may connect by transmitting a registration message to the controlled device 106. The slave module 206 may then register the controller device 104. In some embodiments, the master module 306 may receive an address and connect with one to any number of controlled devices 106. The flow continues at block 606.

At block 606, a determination is made of whether any applications (that are controllable or viewable remotely) are executing on the controlled device. The master module 306 may make this determination based on communication with the slave module 206 on the controlled device 106. For example, after receiving a registration message, the slave module 206 may transmit a list of applications (that are controllable or viewable remotely) that are executing on the controlled device 106. Upon determining that no such applications are executing on the controlled device 106, the flow continue at block 606 (where this determination is again made). Otherwise, the flow continues at block 608.

At block 608, identification of the application(s) to remotely control or view is transmitted to the controlled device. The master module 306 may request controlling or viewing (remotely) of N number of applications on the controlled device 106. The flow continues at block 610.

At block 610, a master graphical form for the application(s) to be controlled or viewed is opened. The master module 306 may open a master graphical form for each of the application(s) to be controlled or viewed. The master graphical form may be opened on the controller device 104. This form may then be populated with various graphics to reproduce the graphical image (being displayed on a display of the controlled device 106) on a display of the controller device 104. This populating is described in the operations of the flow diagram 700 of FIG. 7.

FIG. 7 is a flow diagram for processing events and commands at a controller device that is remotely controlling or viewing an application, according to some embodiments. In particular, FIG. 7 includes a flow diagram 700 that illustrates operations that may be performed by the application control module 308 executing on the controller device 104. The flow diagram 700 is described with reference to FIGS. 1-3. The flow diagram 700 includes two branches. The first branch and the second branch include blocks 708-710 and blocks 712-718, respectively. The operations at blocks 708-710 are executed from an event triggered based on input for the application at the controller device 104. The operations at blocks 712-718 are executed from commands or events triggered at the controlled device 106. The flow diagram 700 commences at block 701.

At block 701, connection is made to the controlled device. The application control module 308 may connect over the network with the controlled device through the master module 306. The application control module 308 may communicate its own identification to the application. Accordingly, the application control module 308 and the application 208 may establish a connection between themselves. The application 208 being remotely controlled or viewed and the application control module 308 may then exchange messages identifying events and commands. Such events and commands may enable the reproduction of the graphical image on the controller device and for remote control of the application 208 by the controller device 104. The flow continues at block 702.

At block 702, request for controls and graphical state is transmitted to the application executing on the controlled device. The application control module 308 may perform this operation. The graphical state may include the current GUI window being display. In particular, a given application 208 may have N number of windows that may be displayed during execution. Accordingly, the graphical state may include an identification of the current window. Based on identification of the window, the application control module 308 may identify the graphics and data to be displayed, the types and locations of different controls on the window for input, etc. The state of the controls for the current window is also requested. The state of the controls may identify whether current controls are highlighted, grayed out, have data therein, etc. The flow continues at block 704.

At block 704, the controls and graphical state are received from the application on the controlled device. The application control module 308 may receive this data. As described, such data include identification of the window, state of the controls, etc. In some embodiments, the data does not include data about pixels on the graphical image being displayed for the application 208. For example, the data does not include a pixel-based reproduction of the graphical image. Accordingly, the data to reproduce the graphical image is much less in comparison to techniques that transmit data for the individual pixels for a graphical image. The flow continues at block 706.

At block 706, the controls and the graphical state are replicated on a display of the controller device. The application control module 308 may perform this operation. In some embodiments, the application control module 308 decodes the data received for the controls and graphical state using the decode library 312. For example, the identification of the window may be decoded to identify the size and type of window, the locations of various parts of the window (such as data, graphics, type and location of control inputs, etc.). The application control module 308 may also decode the controls to identify the current state of the controls on the window. The application control module 308 may then use the decoded data to replicate the graphical state using various functions from the graphics library 310. In particular, the graphics library 310 may include various functions used to reproduce graphics output. For example, the functions may be used for outputting graphics for various controls (such as different types of buttons), lines, various shapes, subwindows for charts, graphics, images, etc., etc. The flow continues at blocks 708 and 712.

The processing of events from input at the controller device 104 is now described. At block 708, a determination is made of whether an event is triggered by input at the controller device. The application control module 308 may receive various events, which may include different inputs for the application. For example, a user of the controller device 104 may select a button, input data into a data input on the GUI window being displayed on the controller device 104. Such input triggers an event for processing by the application control module 308. Upon determining that an event is not triggered, flow continues at blocks 708 and 712. Otherwise the flow continues at block 710.

At block 710, a description of the event is transmitted to the controlled device. The application control module 308 may transmit an identification of the type of event. For example, the identification of the control that received input may be transmitted. Additionally, the data input into the control may also be transmitted. For example, if a button is selected, the identification of the button and that the button was selected is transmitted. If text is input into a text input box, the identification of the text input box and the text itself is transmitted. The flow continues at blocks 708 and 712.

The processing of events or commands executed at the controlled device 106 are now described. At block 712, a determination is made of whether a new command is received from the controlled device 106. The application control module 308 may determine whether a new command is received from the application 208 executing on the controlled device 106. The new command may be a termination command or a command for a control for the application 208. Upon determining that a new command is not received, the flow continues at blocks 708 and 712. Otherwise, the flow continues at block 714.

At block 714, a determination is made of whether the new command is a termination command. The application control module 308 may make this determination. In particular, if the command is a termination command, the message received may be a specific data value that represents termination. The application 208 may transmit a termination command as part of a termination of the application 208 on the controlled device 208, as part of a shut down operation of the controlled device 106, etc. In some embodiments, a local operator at the controlled device 106 may issue the command to prevent remote monitoring or control of the application 208. Upon determining that the new command is not a termination command, the flow continues at block 716. Otherwise, the flow continues at block 718 (which is described in more detail below).

At block 716, the new command, that is for a specified control for the application, is processed. The application control module 308 may perform this operation. The new command may be a command to for updates to the display being shown at the controller devices 104. In particular, the application control module 308 may update the graphical image on the display of the controller device 104 so as to reproduce the graphical image being displayed on a display of the controlled device 106. In some embodiments, the application control module 308 uses the decode library 312 to decode the command received from the controlled device 106. For example, the new command may indicate that a new graphical image is to be displayed, that parts of the current graphical image are to be modified, etc. The new command may identify the GUI window to update and the types of updates to be performed. For example, the new command may indicate that a current graph, an input, etc. being displayed needs to be updated. The application control module 308 may then use the decoded data and the graphics library 308 to update the display 304. The application control module 308 may invoke various functions from the graphics library 308 to perform this update. The flow continues at blocks 708 and 712.

At block 718, the monitoring or control at the controller device is terminated. The application control module 308 may perform this operation. For example, the application control module 308 may terminate itself. Alternatively, the application control module 308 may continue execution (while suspending monitor and control of the application 208). The operations of the flow diagram are the complete.

While the operations in the flow diagram 700 are described such that the application control module 308 performs periodic checking, in some embodiments, such operations are interrupt driven. For example, after a new command is received from a controlled device 106, the application control module 308 receives an interrupt to process the new command.

Example Computer Environment

A detailed block diagram of an example computer environment, according to some embodiments, is now described. In particular, FIG. 8 illustrates a computer that may be used as part of the remote controlling and viewing of an application, according to some embodiments. A computer system 800 may be representative of the controller device 104 or the controlled device 106.

As illustrated in FIG. 8, the computer system 800 comprises processor(s) 802. The computer system 800 also includes a memory unit 830, processor bus 822, and Input/Output controller hub (ICH) 824. The processor(s) 802, memory unit 830, and ICH 824 are coupled to the processor bus 822. The processor(s) 802 may comprise any suitable processor architecture. The computer system 800 may comprise one, two, three, or more processors, any of which may execute a set of instructions in accordance with embodiments of the invention.

The memory unit 830 may store data and/or instructions, and may comprise any suitable memory, such as a dynamic random access memory (DRAM). The computer system 800 also includes IDE drive(s) 808 and/or other suitable storage devices. A graphics controller 804 controls the display of information on a display device 806, according to some embodiments of the invention.

The input/output controller hub (ICH) 824 provides an interface to I/O devices or peripheral components for the computer system 800. The ICH 824 may comprise any suitable interface controller to provide for any suitable communication link to the processor(s) 802, memory unit 830 and/or to any suitable device or component in communication with the ICH 824. For one embodiment of the invention, the ICH 824 provides suitable arbitration and buffering for each interface.

For some embodiments of the invention, the ICH 824 provides an interface to one or more suitable integrated drive electronics (IDE) drives 808, such as a hard disk drive (HDD) or compact disc read only memory (CD ROM) drive, or to suitable universal serial bus (USB) devices through one or more USB ports 810. For one embodiment, the ICH 824 also provides an interface to a keyboard 812, a mouse 814, a CD-ROM drive 818, one or more suitable devices through one or more firewire ports 816. For one embodiment of the invention, the ICH 824 also provides a network interface 820 though which the computer system 800 can communicate with other computers and/or devices.

In some embodiments, the computer system 800 includes a non-transitory machine-readable storage medium that stores a set of instructions (e.g., software) embodying any one, or all, of the methodologies for described herein. Furthermore, software may reside, completely or at least partially, within memory unit 830 and/or within the processor(s) 802.

Wellsite Operating Environments

Figure 9A:
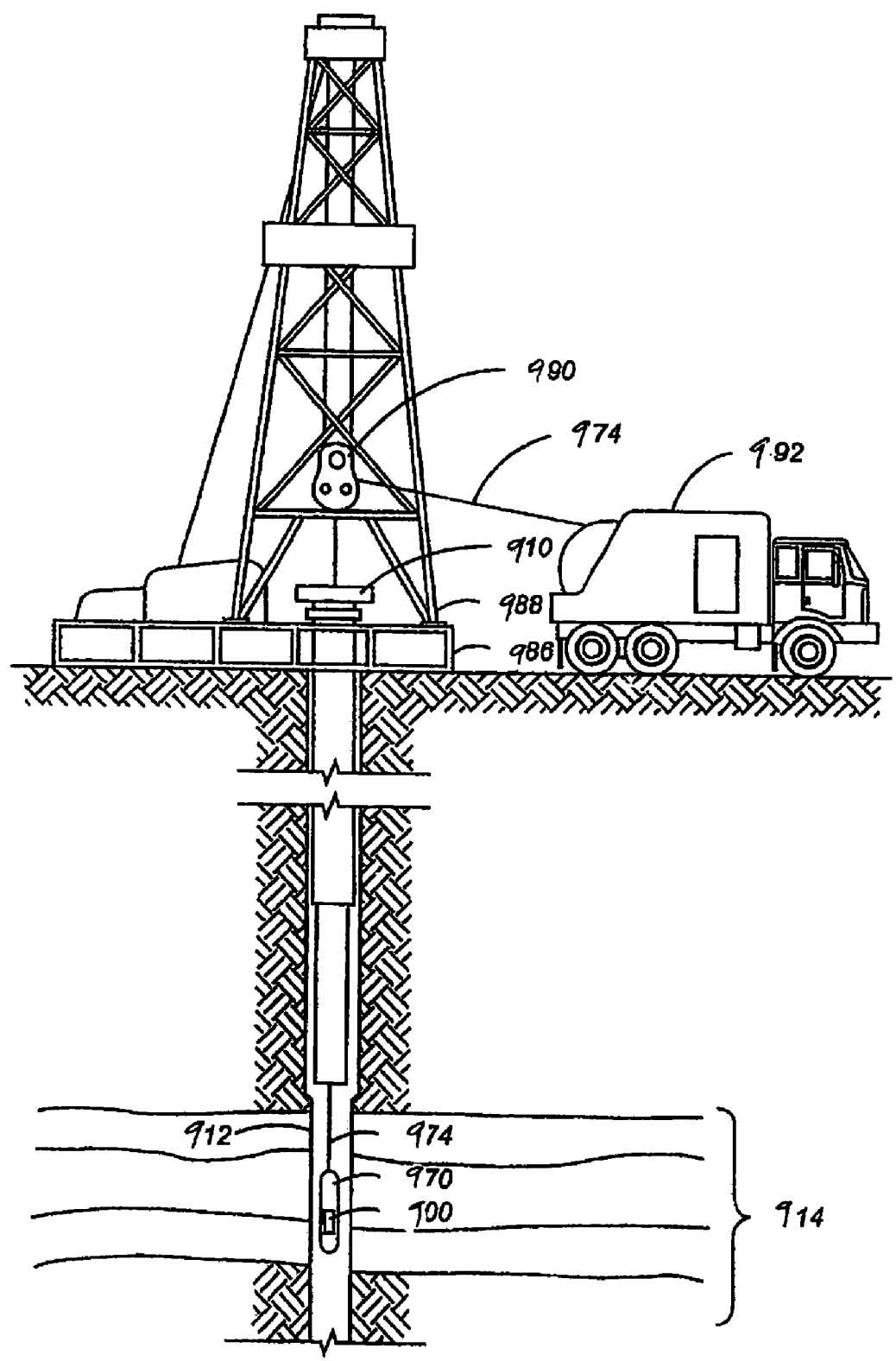
FIG. 9A illustrates a drilling well during wireline logging operations, according to some embodiments.

Embodiments may be used in any of a number of operating environments. One example environment is related to remote wellsite monitoring and controlling. For example, the controlled device 106 may be at or near the wellsite, while the controller device 104 may be remote from the wellsite. Accordingly, an operator may remotely control or view the wellsite operations. Wellsite operating environments, according to some embodiments, are now described. FIG. 9A illustrates a drilling well during wireline logging operations, according to some embodiments. A drilling platform 986 is equipped with a derrick 988 that supports a hoist 990. Drilling of oil and gas wells is commonly carried out by a string of drill pipes connected together so as to form a drilling string that is lowered through a rotary table 910 into a wellbore or borehole 912. Here it is assumed that the drilling string has been temporarily removed from the borehole 912 to allow a wireline logging tool body 970, such as a probe or sonde, to be lowered by wireline or logging cable 974 into the borehole 912. Typically, the tool body 970 is lowered to the bottom of the region of interest and subsequently pulled upward at a substantially constant speed. During the upward trip, instruments included in the tool body 970 may be used to perform measurements on the subsurface formations 914 adjacent the borehole 912 as they pass by. The measurement data can be communicated to a logging facility 992 for storage, processing, and analysis. The logging facility 992 may be provided with electronic equipment for various types of signal processing. Similar log data may be gathered and analyzed during drilling operations (e.g., during Logging While Drilling, or LWD operations).

Figure 9B:
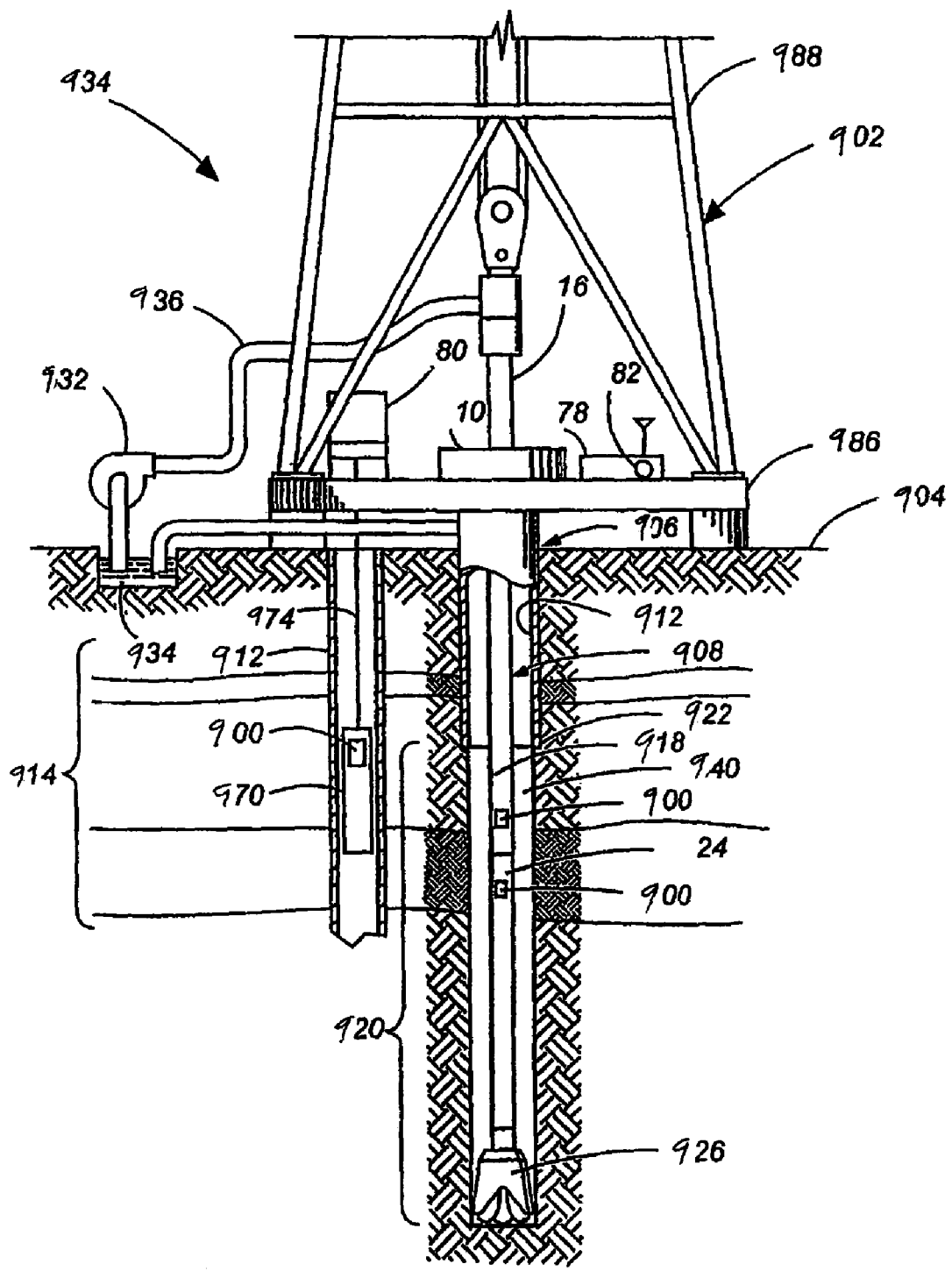
FIG. 9B illustrates a drilling well during Measurement While Drilling (MWD) operations, according to some embodiments.

FIG. 9B illustrates a drilling well during Measurement While Drilling (MWD) operations, according to some embodiments. It can be seen how a system 964 may also form a portion of a drilling rig 902 located at a surface 904 of a well 906. The drilling rig 902 may provide support for a drill string 908. The drill string 908 may operate to penetrate a rotary table 910 for drilling a borehole 912 through subsurface formations 914. The drill string 908 may include a Kelly 916, drill pipe 918, and a bottom hole assembly 920, perhaps located at the lower portion of the drill pipe 918.

The bottom hole assembly 920 may include drill collars 922, a downhole tool 924, and a drill bit 926. The drill bit 926 may operate to create a borehole 912 by penetrating the surface 904 and subsurface formations 914. The downhole tool 924 may comprise any of a number of different types of tools including MWD (measurement while drilling) tools, LWD (logging while drilling) tools, and others.

During drilling operations, the drill string 908 (perhaps including the Kelly 916, the drill pipe 918, and the bottom hole assembly 920) may be rotated by the rotary table 910. In addition to, or alternatively, the bottom hole assembly 920 may also be rotated by a motor (e.g., a mud motor) that is located downhole. The drill collars 922 may be used to add weight to the drill bit 926. The drill collars 922 also may stiffen the bottom hole assembly 920 to allow the bottom hole assembly 920 to transfer the added weight to the drill bit 926, and in turn, assist the drill bit 926 in penetrating the surface 904 and subsurface formations 914.

During drilling operations, a mud pump 932 may pump drilling fluid (sometimes known by those of skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation 914 cuttings created by operating the drill bit 926.

General

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
    receiving, at a controller device, an input for a software application that is executing on a controlled device at a remote location, wherein a copy of the software application is not executing on the controller device and the controller device comprises a display that reproduces at least a graphical image, based on non-pixel-based reproduction data, that is an output of the software application executing on the controlled device;
    transmitting, over a network, an identification of an event for the software application, that is a result of the input, to the controlled device to remotely control execution of the software application, wherein the identification of the event comprises data for control of the software application;
    processing the control data to control execution of the software application, including causing the controlled device to perform one or more actions at the remote location selected from monitoring or controlling one or more parameters of mechanical equipment coupled to the controlled device; and
    transmitting an update event to the controller device in response to processing the control data at the controlled device, wherein the update event is used to update the graphical image on the display of the controller device based on non-pixel-based reproduction data provided from the controlled device.

2. The method of claim 1, further comprising processing, by the software application on the controlled device, the data for control of the software application.

3. The method of claim 1, comprising wherein monitoring or controlling the one or more parameters of mechanical equipment includes controlling an operation at a wellsite for recovery of hydrocarbons.

4. The method of claim 1, further comprising viewing the reproduction of the graphical image on the display of the controller device, wherein the graphical image is constructed at the controller device based on non-pixel-based data received from the controlled device.

5. The method of claim 1, further comprising:
    receiving, over the network, data transmitted from the controlled device to the controller device;
    and decoding a message, event, or graphical image at the controller device based on the data received from the controlled device.

6. The method of claim 1, further comprising receiving, at the controller device, a plurality of inputs for a plurality of software applications that are executing on one or more controlled devices at the remote location.

7. The method of claim 1, wherein the input received at the controller device is generated, at least in part, from local user input at the remote site and entered using the controlled device.

8. The method of claim 1, further comprising transmitting, over the network, an identification of the software application being executed on the controlled device to at least a second controller device.

9. The method of claim 1, further comprising transmitting, over the network, one or more ping messages from the controller device to the controlled device to establish communication with the controlled device.

10. A non-transitory machine-readable storage medium including instructions, which when executed by a machine, cause the machine to perform operations comprising:
    receiving, by a controlled device, an identification of one or more events used an to control a software application executing on the controlled device, wherein the identification of the one or more events is based on input from a controller device that is remote from the controlled device, wherein the controller device comprises a display that reproduces at least a graphical image that is an output of the software application executing on the controlled device, wherein the controlled device does not provide pixel-based reproduction data to the controller device for reproduction of the graphical image for the software application;
    processing input the identification of the one or more events to control execution of the software application;
    monitoring or controlling one or more parameters of mechanical equipment coupled to the controlled device with the execution of the software application; and
    transmitting an update event to the controller device in response to processing the identification of the one or more events at the controlled device, wherein the update event is used to update the graphical image on the display of the controller device based on non-pixel-based reproduction data provided from the controlled device.

11. The machine-readable storage medium of claim 10, wherein the input is generated from a user input on the controller device, wherein the user input is inputted using the reproduction of the graphical image on the display of the controller device.

12. The machine-readable storage medium of claim 11, wherein the user input is from a group consisting of a selection of a button being displayed on the reproduction of the graphical image, data input into a text box being displayed on the reproduction of the graphical image, voice data input from a microphone, and data input from a data file.

13. A system comprising:
a controller device, comprising:
a display configured to output a graphical image, based on non-pixel-based data, reproducing a graphic output for a software application executing on a controlled device at a remote location; and
an application control module operably coupled to the processor and the display, the application control module operated in connection with the processor and configured to process an input, entered into the controller device, for control of the software application at the remote location, wherein the software application is not executing on the controller device, wherein the application control module is configured to transmit, over a network, an identification of an event for the software application, that is a result of the input, wherein the identification of the event comprises data for control of the software application;
wherein the data for control of the software application is provided from the controller device and is configured to be processed at the controlled device to perform one or more actions at the remote location, the one or more actions including monitoring or controlling one or more parameters of mechanical equipment coupled to the controller device; and
wherein the controller device is configured to receive an update event, transmitted by the controlled device, in response to processing the software application control data at the controlled device, wherein the update event is used to update the graphical image on the display of the controller device based on non-pixel-based reproduction data.

14. The system of claim 13, wherein the controller device further comprises an input device from a group consisting of a keyboard, a mouse, a microphone, and auto-generated programmatic input, wherein the application control module is configured to receive the input from the input device.

15. The system of claim 13, wherein the software application is configured to control and monitor one or more operations of the mechanical equipment at a wellsite for recovery of hydrocarbons.

16. A system comprising:
a controlled device, comprising:
a processor to execute a software application that is controllable by a controller device coupled to the controlled device over a network, wherein the software application is configured to receive an event message that includes input for the software application from the controller device, wherein the controller device generates input for the software application independent of executing the software application, wherein the event message comprises an identification of the input and data for the input;
wherein execution of the software application, including processing the identification of the input, results in monitoring or controlling one or more parameters of mechanical equipment coupled to the controlled device;
wherein the controlled device is configured to provide non-pixel-based reproduction data to the controller device for display of a graphical image that is an output of the software application;
and wherein the controlled device is further configured to transmit an update event to the controller device in response to processing the identification of the input, wherein the update event is used to update the displayed graphical image based on non-pixel-based reproduction data.

17. The system of claim 16, wherein the event message does not include pixel-based reproduction data.

18. The apparatus system of claim 16, wherein the software application is configured to transmit a different event message to the controller device, the different event message used to update a reproduction of a graphical image on a display of the controller device, wherein the graphical image comprises a graphical output for the software application.

19. The apparatus system of claim 18, wherein the different event message is provided in response to the event message that includes the input for the software application.

20. The system of claim 16, wherein the controlled device is at the surface of the Earth and near a wellsite, and wherein the software application is configured to control an operation of the mechanical equipment at the wellsite for recovery of hydrocarbons.

21. The system of claim 16, wherein the controlled device is configured for processing a plurality of event messages received by the software application, including identifying whether an event message is requesting data regarding a state of the software application.

22. The system of claim 16, wherein controlling one or more parameters of mechanical equipment includes altering one or both of fluid flow or drill string rotation at a wellsite for drilling, evaluating or recovering hydrocarbons from downhole.

* * * * *

UNITED STATES PATENT AND TRADEMARK OFFICE
CERTIFICATE OF CORRECTION

| | | |
|---|---|---|
| PATENT NO. | : 8,095,936 B2 | Page 1 of 1 |
| APPLICATION NO. | : 11/700392 | |
| DATED | : January 10, 2012 | |
| INVENTOR(S) | : Marcus L. Avery et al. | |

It is certified that error appears in the above-identified patent and that said Letters Patent is hereby corrected as shown below:

In column 16, lines 1-3, delete "2. The method of claim 1, further comprising processing, by the software application on the controlled device, the data for control of the software application.".

In column 16, line 4, in Claim 3, after "claim 1," delete "comprising".

In column 16, line 39, in Claim 10, after "used" delete "an".

In column 16, line 50, in Claim 10, after "processing" delete "input".

In column 17, line 6, in Claim 13, after "comprising:" insert -- a processor; --.

In column 18, line 25, in Claim 18, after "The" delete "apparatus".

In column 18, line 31, in Claim 19, after "The" delete "apparatus".

Signed and Sealed this
Twentieth Day of March, 2012

David J. Kappos
*Director of the United States Patent and Trademark Office*